June 14, 1932.  J. E. LANGLEY  1,862,935
CURRENT METER INDICATING DEVICE
Filed March 8, 1929  2 Sheets-Sheet 1

Inventor
John E. Langley
By
Attorney

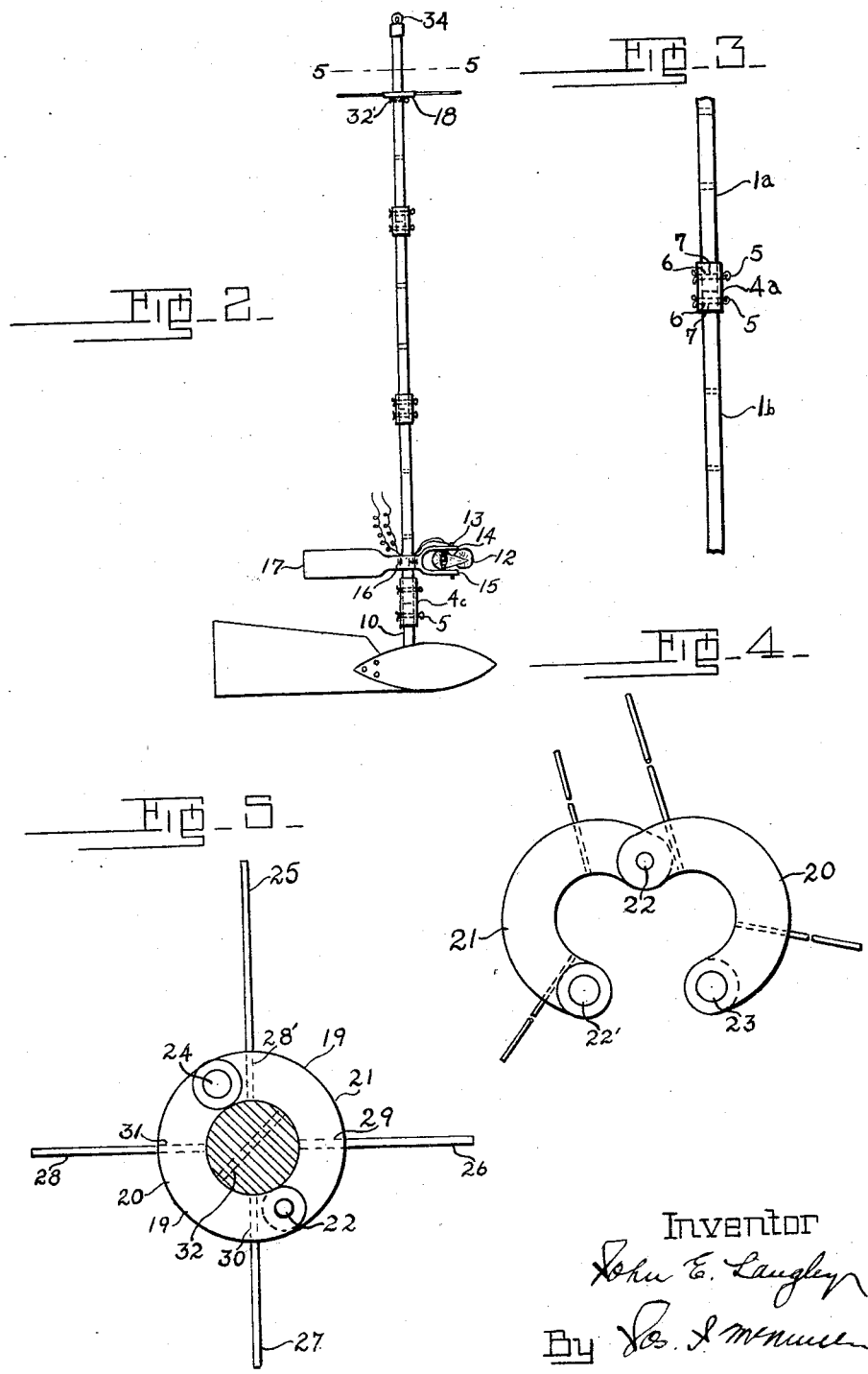

Patented June 14, 1932

1,862,935

UNITED STATES PATENT OFFICE

JOHN E. LANGLEY, OF THE UNITED STATES ARMY, OF KANSAS CITY, MISSOURI

CURRENT METER INDICATING DEVICE

Application filed March 8, 1929. Serial No. 345,555.

(GRANTED UNDER THE ACT OF MARCH 3, 1883, AS AMENDED APRIL 30, 1928; 370 O. G. 757)

This invention described herein may be manufactured and used by or for the Government for governmental purposes, without the payment to me of any royalty thereon.

This invention relates generically to current meters for determining the velocity of stream flow, more especially it is directed to an indicator device operable in connection with the meter and its supporting rod to indicate any deviations of the meter from a position requisite to accurate observations.

One of the objects of this invention is to provide means located above the surface of the water and indicative of the position of the longitudinal axis of the meter with respect to the cross section of the stream on which measurements are taken whereby the operator at the observation station may make the requisite corrections for any deviations of the longitudinal axis of the meter from the assumed position on which calculations are based.

Another object of this invention is to provide an indicator in the nature of an arm which is clamped to the meter supporting rod in a plane coincident with the longitudinal axis of the meter so that any movement of the meter produced by cross currents beneath the surface of the water may be noted by the operator and due corrections made.

Another object of this invention is to provide an indicator in the form of a clamp which may be engaged and disengaged with the meter supporting rod at various points along its length depending on the water level, the clamp carrying two pairs of arms intersecting at right angles, one pair being arranged coincident with the longitudinal axis of the meter the other parallel to the section on which measurements are taken.

Another object of this invention is to provide a meter supporting rod formed in sections interconnected by removable sleeves, the rod having openings arranged at predetermined points along its length which are indicative of different water levels, said openings also serving to accommodate the supporting element for the indicator clamp.

Other objects of this invention are to provide an indicator in connection with a current meter which is simple of construction, inexpensive to produce and which will give an accurate indication of the position of the meter axis with respect to the cross-section of the stream; to effect an apparatus which may be readily assembled and disassembled to facilitate transportation and finally to produce an indicator capable of effectively functioning with various types of standard current meters.

With these and other objects in view this invention consists in certain novel details of construction, combination and arrangement of parts to be more particularly hereinafter set forth and claimed.

Briefly stated, this invention comprises a meter-supporting rod formed in sections, preferably three, interconnected by removable sleeves, a weight secured to the lower end of the rod and equipped with a stabilizing vane or rudder, a current meter mounted on the rod slightly above the weight, an indicator adapted to be clamped to the rod above the surface of the water, and supporting four arms intersecting at right angles, one pair of arms extending parallel with the longitudinal axis of the meter, the other parallel to the cross-sectional area of the stream on which measurements are taken. With this arrangement any movement of the meter below the water is immediately indicated by a corresponding movement of the indicator above the water.

Referring more particularly to the accompanying drawings in which corresponding parts are indicated by similar reference characters:

Fig. 2 is a side elevation of the entire assembly constituting this invention,

Fig. 3 is a fragmentary elevation of two sections of the meter rod and the removable sleeve effecting their interconnection, Fig. 4 is a fragmentary top plan of the indicator clamp with the sections thereof in open position, and Fig. 5 is a transverse section taken on the line 5—5 of Fig. 2.

Figure 1:
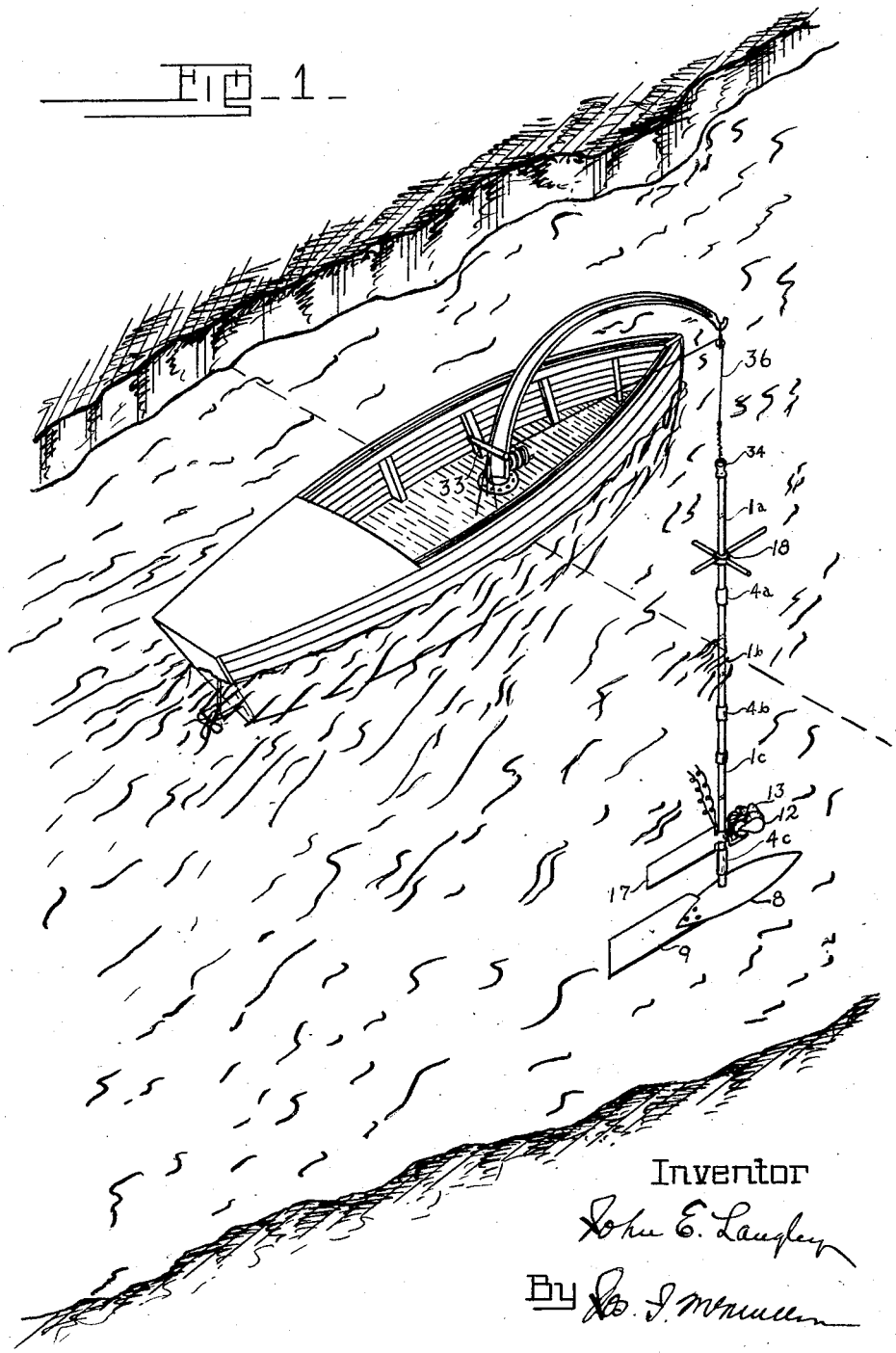
Fig. 1 is a perspective view illustrating a boat station and the current measuring assembly operatively suspended in the section of the stream on which measurements are being taken.

In determining the velocity of stream flow calculations are based on the assumption that the normal position of the meter rod is vertical to a base line defining the cross-sectional area of the stream on which measurements are being taken and that the longitudinal axis of the current meter is in a position at right angles to said cross-sectional area of the stream, but not infrequently this assumption is erroneous due to cross-currents below the surface of the water which position the longitudinal axis of the meter at more or less of an angle to the stream section and this condition has led to inaccuracies in determinations as the operator at the observation station had no means of knowing the position of the meter situated several feet below the surface of the water and it is therefore the aim and purpose of this invention to provide an indicator above the surface of the water and having one or more arms correlated with respect to the meter whereupon any movement on the part of the meter on its rod may be noted and the extent of such movement determined through the instrumentality of a prismatic compass or similar instrument at the station.

In the illustrated embodiment characterizing this invention there is shown a current meter supporting rod formed in sections (1a), (1b) and (1c), the ends of which are interconnected by detachable sleeves (4a), and (4b) secured in position by pins (5) extending through registering openings (6) and (7) in the sleeves and rod sections. To insure vertical suspension of the rod in the water there is secured to its lower end a weight (8) to which is attached a stabilizing rudder (9). Immediately above the sleeve (4c) rigidly connecting the lower end of section (1c) to the upper end of the weight supporting stem (10) is a meter (11) of the type which briefly stated consists of a series of buckets (12) affixed to a vertical axis (13) revolving between the bearings (14) and (15) supported by a frame (16) fixedly secured to the rod section (1c) so as to turn with it. To the other end of the frame is attached a stabilizing rudder (17) which serves to keep the axis of the meter parallel with the current as will be understood without discussion.

The meter (11) is of course provided with the requisite electrical connections leading to an electrical indicator in the nature of an automatic recording device or telephone buzzer situated at the observation station. As the meter just described is of standard construction and may be replaced by other similarly functioning apparatus reference thereto has been made for descriptive purposes only and the connections and electrical recorder referred to have been omitted from the drawings.

For the purpose of indicating the position of the longitudinal axis of the meter with respect to the cross-sectional area of the stream on which measurements are taken, the upper section (1a) of the meter supporting-rod, in the embodiment shown, is provided with an indicator (18) dimensioned for ready observation and consisting of a clamp (19) embodying two semi-circular sections (20) and (21) hingedly connected at one end as at (22) and adapted to encircle the rod. To retain said sections in embracing relation with respect to the rod section on which it is mounted their free ends are formed with openings (22′) and (23) which when aligned accommodate a locking pin (24) as clearly shown in Fig. 5 of the drawings.

Radially extending from the external periphery of the clamp are a series of indicating arms (25), (26), (27) and (28), the inner ends of which seat in openings (28′), (29), (30) and (31) formed in the clamp sections, said openings being so arranged when the sections are closed about the meter rod the aligned arms (25) and (27) will extend at right angles to the aligned arms (26) and (28), as clearly shown in Fig. 5 of the drawings.

To attach the indicator at various points in the length of the meter supporting-rod, preferably at five foot intervals, the respective sections of the meter supporting-rod are formed with transversely extending bores (32) for the reception of holding pins (32′) underlying the clamp as clearly shown in Fig. 2 of the drawings. All of the arms 26, 27 and 28 are of equal length, about one foot, with exception of the arm 25 which is six inches longer and constitutes the arm on which the readings are taken.

As the arms (25) and (27), when the clamp is suitably adjusted on the rod, extend in parallelism with the longitudinal axis of the meter and as the arms (26) and (28) are adapted to extend parallel with the base line defining the cross-sectional area of the stream on which measurements are being taken, it is manifest any movement from normal of the meter rod or of the longitudinal axis of the meter, will be indicated by a corresponding movement of the indicator arm with respect to the base line. The extent of this movement may be ascertained by means of a suitable prismatic compass or similar viewing instrument (33) located at the observation station.

In the application of this apparatus an eye (34) attached to the upper end of the meter supporting rod is connected with pulley system (36) suitably mounted on the boat station.

In the light of the preceding disclosure it is apparent when the weighted meter rod is suspended in a stream, the current velocity of which is to be determined the operator viewing the intersecting arms of the indicator through the compass at the station may not only note any deviation of the longitudinal axis of the meter with respect to the cross-sectional area of the stream on which measurements are being taken, but also determine the extent of the angle made by such axis and thus make corrections necessary to an accurate determination of the current flow of the stream. Moreover by taking readings on the arms (25) and (27) and (26) and (28) in deviation of the rod from its normal vertical position either in a lateral or a horizontal direction may be noted and the extent of such deviations determined.

In conclusion it is evident this invention provides a simple indicating device susceptible of use with any of the standard current meters and which will materially contribute to greater accuracy in measuring the velocity of stream where currents under the surface of the water tend to revolve the meter from the assumed position on which calculations are based.

Although in the foregoing certain elements have been described as best adapted to perform the functions allotted to them, nevertheless it is to be understood that various minor changes may be resorted to within the scope of the appended claim without departing from or sacrificing any of the principles of this invention.

Having described my invention, what I claim as new and wish to secure by Letters Patent is:

In a device of the character described, the combination with a meter rod adapted to be vertically suspended in a stream, the current velocity of which is to be determined, and a current meter attached to the lower end of the rod and movable therewith, said meter including means for maintaining its longitudinal axis parallel to the flow of the stream; of an indicating mechanism secured to the meter rod at a point above the surface of the water and consisting of a clamp formed of hingedly connected sections adapted to embrace the rod, a plurality of arms supported by the sections, certain of said arms extending at right angles to the longitudinal axis of the current meter, the other projecting in parallelism with the longitudinal axis of the meter whereby to indicate deviations of the meter rod and the longitudinal axis of said meter with respect to said base line.

JOHN E. LANGLEY.